(12) United States Patent
Handshaw et al.

(10) Patent No.: US 11,816,528 B2
(45) Date of Patent: Nov. 14, 2023

(54) SLOT SCANNER ASSEMBLY WITH WAKEUP SYSTEM

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Miguel Orlando Rodriguez Ortiz, Coram, NY (US); Joseph D. Giordano, Bayville, NY (US); Gennaro Squillante, Centereach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 35 days.

(21) Appl. No.: 17/709,783

(22) Filed: Mar. 31, 2022

(65) Prior Publication Data

US 2023/0316021 A1    Oct. 5, 2023

(51) Int. Cl.
*G06K 7/14*    (2006.01)

(52) U.S. Cl.
CPC .................................. *G06K 7/1413* (2013.01)

(58) Field of Classification Search
CPC ........................... G06K 7/1404; G06K 7/1413
USPC ........................................ 235/462.14, 462.31
See application file for complete search history.

(56) References Cited

U.S. PATENT DOCUMENTS

| | | | |
|---|---|---|---|
| 2005/0103862 A1* | 5/2005 | Zhu ..................... | G06K 7/10851 235/462.31 |
| 2006/0118627 A1* | 6/2006 | Joseph ............... | G06K 7/10732 235/454 |
| 2007/0187509 A1* | 8/2007 | Kotlarsky .......... | G06K 7/10801 235/462.31 |
| 2010/0065641 A1* | 3/2010 | Liu ..................... | G06K 7/10831 235/462.32 |
| 2010/0252635 A1* | 10/2010 | Drzymala .......... | G06K 7/10722 235/462.41 |

* cited by examiner

*Primary Examiner* — Paultep Savusdiphol
(74) *Attorney, Agent, or Firm* — Yuri Astvatsaturov (57) ABSTRACT

Slot scanners with wakeup systems are disclosed herein. An example slot scanner assembly includes a wakeup system having an infrared (IR) transmitter configured to project IR illumination through a window of the slot scanner and an IR receiver. The IR receiver has a second field-of-view (FOV) directed through the window that overlaps a first FOV of an imaging assembly of the slot scanner by at least 50% at the window and has a second central axis that is non-perpendicular to the window such that the second central axis is tilted downward from horizontal with the slot scanner assembly positioned in a vertical first configuration where the window is in a generally upright orientation. A controller of the slot scanner is configured to activate an illumination system when the IR receiver detects IR illumination reflected from an object in the second FOV of the IR receiver.

25 Claims, 10 Drawing Sheets

SLOT SCANNER ASSEMBLY WITH WAKEUP SYSTEM

BACKGROUND

In retail environments where slot scanners are used, illumination from the slot scanners when used in a horizontal orientation and illumination reflections from metal countertops or other reflective or partially reflective surfaces when used in a vertical orientation can be very annoying to users. Therefore, there is a need for a slot scanner having an efficient wakeup system so that the illumination from the slot scanner can be shut off when the slot scanner is not in use and activated when an object is brought near the slot scanner to be scanned.

SUMMARY

In an embodiment, the present invention is a slot scanner assembly comprising a housing, a window, an imaging assembly, an illumination system, a controller, an image decoder, and a wakeup system. The housing includes an optical cavity and an opening and the window at least partially covers the opening. The imaging assembly is located within the housing and has a first field-of-view (FOV) directed through the window. The first FOV has a first central axis and the imaging assembly is configured to capture an image frame of an environment appearing in the first FOV. The illumination system is configured to provide illumination across at least a portion of the first FOV of the imaging assembly. The controller is in communication with the imaging assembly to control operation of the imaging assembly and with the illumination system to control operation of the illumination system. The image decoder is in communication with the imaging assembly and the controller and is configured to receive the image frame and decode a barcode captured in image data captured by the imaging assembly. The wakeup system comprises a first infrared (IR) transmitter and an IR receiver. The first IR transmitter is positioned within the housing and is configured to project IR illumination through the window. The IR receiver is positioned within the housing and has a second FOV directed through the window. The second FOV overlaps the first FOV by at least 50% at the window and has a second central axis that is non-perpendicular to the window such that the second central axis is tilted downward from horizontal with the slot scanner assembly positioned in a vertical first configuration where the window is in a generally upright orientation. The controller is in communication with the wakeup system and is configured to activate the illumination system when the IR receiver detects IR illumination reflected from an object in the second FOV of the IR receiver.

In a variation of this embodiment, the first IR transmitter and the IR receiver are positioned in an upper portion of the housing, above the first FOV of the imaging assembly that is directed through the window.

In another variation of this embodiment, the IR receiver is recessed in the housing and is spaced apart from a front face of the housing by at least 1.25 inches.

In another embodiment, the present invention is a slot scanner assembly comprising a housing, a window, an imaging assembly, an illumination system, a controller, an image decoder, and a wakeup system. The housing includes an optical cavity and an opening and the window at least partially covers the opening. The imaging assembly is located within the housing and has a first field-of-view (FOV) directed through the window. The first FOV has a first central axis and the imaging assembly is configured to capture an image frame of an environment appearing in the first FOV. The illumination system is configured to provide illumination across at least a portion of the first FOV of the imaging assembly. The controller is in communication with the imaging assembly to control operation of the imaging assembly and with the illumination system to control operation of the illumination system. The image decoder is in communication with the imaging assembly and the controller and is configured to receive the image frame and decode a barcode captured in image data captured by the imaging assembly. The wakeup system comprises a first infrared (IR) transmitter and an IR receiver. The first IR transmitter is positioned within the housing and is configured to project IR illumination through the window. The IR receiver is positioned within the housing and has a second FOV directed through the window. The second FOV completely overlaps the first FOV at the window and has a second central axis that generally parallel to the first central axis of the first FOV of the imaging assembly. The controller is in communication with the wakeup system and is configured to activate the illumination system when the IR receiver detects IR illumination reflected from an object in the second FOV of the IR receiver.

In a variation of this embodiment, the first IR transmitter and the IR receiver are positioned in an upper portion of the housing, above the first FOV of the imaging assembly that is directed through the window.

In another variation of this embodiment, the IR receiver is recessed in the housing and is spaced apart from a front face of the housing by at least 1.25 inches.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example slot scanner assemblies disclosed herein include a wakeup system that provides a wide field-of-view that substantially overlaps the field-of-view of the imaging assembly to provide enhanced wakeup capabilities, especially for objects swiped from various directions, with the slot scanner assembly in either a generally upright orientation or a generally horizontal orientation.

Figure 1:
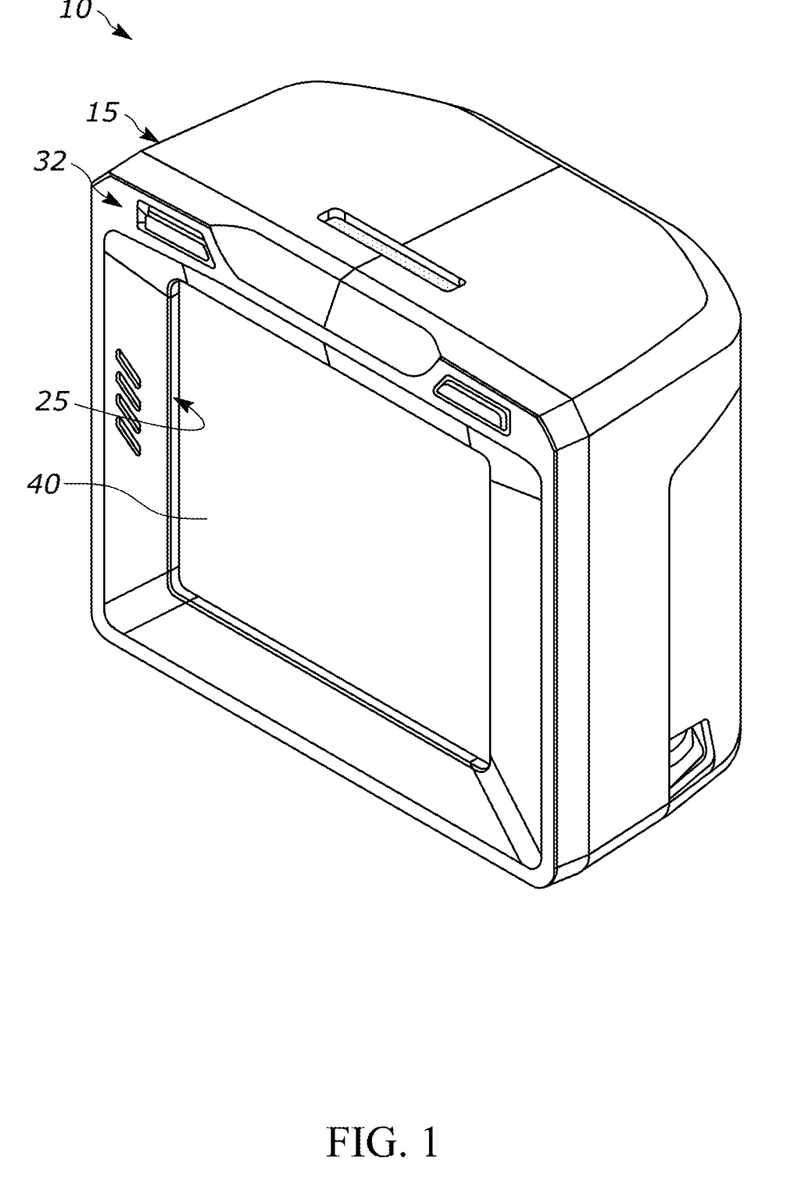
FIG. 1 illustrates a front perspective view of an example slot scanner assembly.

Referring to FIG. 1, an example slot scanner assembly 10 is illustrated for capturing at least one image of an object appearing in a field-of-view (FOV) of slot scanner assembly 10. As shown in FIGS. 2-7, slot scanner assembly 10 can generally include a housing 15, a window 40, imaging assembly 50, an illumination system 80, a controller 95, an image decoder 100, and a first example wakeup system 200A.

Housing 15 is configured to accommodate all of the opto-mechanics such as imaging assembly 50, illumination system 80, controller 95, and image decoder 100, and includes an optical cavity 20 and an opening 25. Optical cavity 20 is a generally hollow region that allows light to pass through to imaging assembly 50. Housing 15 preferably has a width between 5 and 7 inches and may be constructed from any number of suitable materials such as, for example, metals and/or polymers. Window 40 is generally supported by housing 15, is configured to allow light to pass into and out of optical cavity 20, and at least partially covers opening 25 in housing 15.

Imaging assembly 50 is located within housing 15 and has a first FOV 55 that is directed through window 40 and has a first central axis 60. Imaging assembly 50 is configured to capture an image frame of an environment appearing in first FOV 55 and can include any number of image sensors, which can each include a plurality of photosensitive elements. Illumination system 80 is also located within housing 15, includes at least one light source 85, such as one or more light emitting diodes, and is configured to provide illumination across at least a portion of first FOV 55 of imaging assembly 50 to illuminate objects within first FOV 55. Controller 95 is communicatively coupled with imaging assembly 50 and illumination system 80 to control operation of both imaging assembly 50 and illumination system 80. Image decoder 100 is communicatively coupled with imaging assembly 50 and controller 95 and is configured to receive an image frame from imaging assembly 50 and decode a barcode captured in image data in the image frame from imaging assembly 50.

In the example shown in FIGS. 2-7, first example wakeup system 200A is positioned within housing 15 and generally includes a first infrared (IR) transmitter 205 and an IR receiver 225, which are preferably positioned in an upper portion 30 of housing 15, above first FOV 55 of imaging assembly 50 that is directed out of window 40. Wakeup system 200A can also include a second IR transmitter 220, with first IR transmitter 205 being positioned on a first side of IR receiver 225 and second IR transmitter 220 being positioned on a second side of IR receiver 225, opposite the first side and first IR transmitter 205. Controller 95 is also in communication with wakeup system 200A and is configured to activate illumination system 80 when IR receiver 225 detects IR illumination reflected from an object within second FOV 230A of IR receiver 225. By activating illumination system 80 only when wakeup system 200A detects an object within second FOV 230A, illumination from illumination system 80 that may be directed at or reflected towards a user when slot scanner assembly 10 is not in use can be avoided.

First IR transmitter 205 and second IR transmitter 220 are configured to project IR illumination through window 40. Preferably, a first portion 210 of the IR illumination from first IR transmitter 205 and second IR transmitter 220 is transmitted directly through window 40 and a second portion 215 of the IR illumination from first IR transmitter 205 and second IR transmitter 220 is scattered off of IR scattering walls 35 within housing 15 and out of window 40. IR scattering walls 35 can be formed, for example, by adding a texture to the internal wall of optical cavity 20. Having second portion 215 of the IR illumination from first IR transmitter 205 and second IR transmitter 220 scatter off of IR scattering walls 35 allows shiny or reflective objects, such as loyalty cards or smart phones, to reflect the IR illumination back to IR receiver 225 regardless of the presentation angle since scattering the second portion 215 of the IR illumination creates a diversity of incidence angles that strike the object, ensuring that a shiny or reflective object will reflect at least a portion of the IR illumination back towards IR receiver 225. This is especially important in large slot scanner assemblies, because since second FOV 230A of IR receiver 225 would have to be wide, the object would have to be at a very specific angle to wake up slot scanner assembly 10 with direct IR illumination alone. In the example shown illumination system 80, first IR transmitter 205, and IR receiver 225 are located on a common printed circuit board (PCB) 105. However, could be located on individual PCBs or any combination of PCBs, as appropriate.

Figure 6:
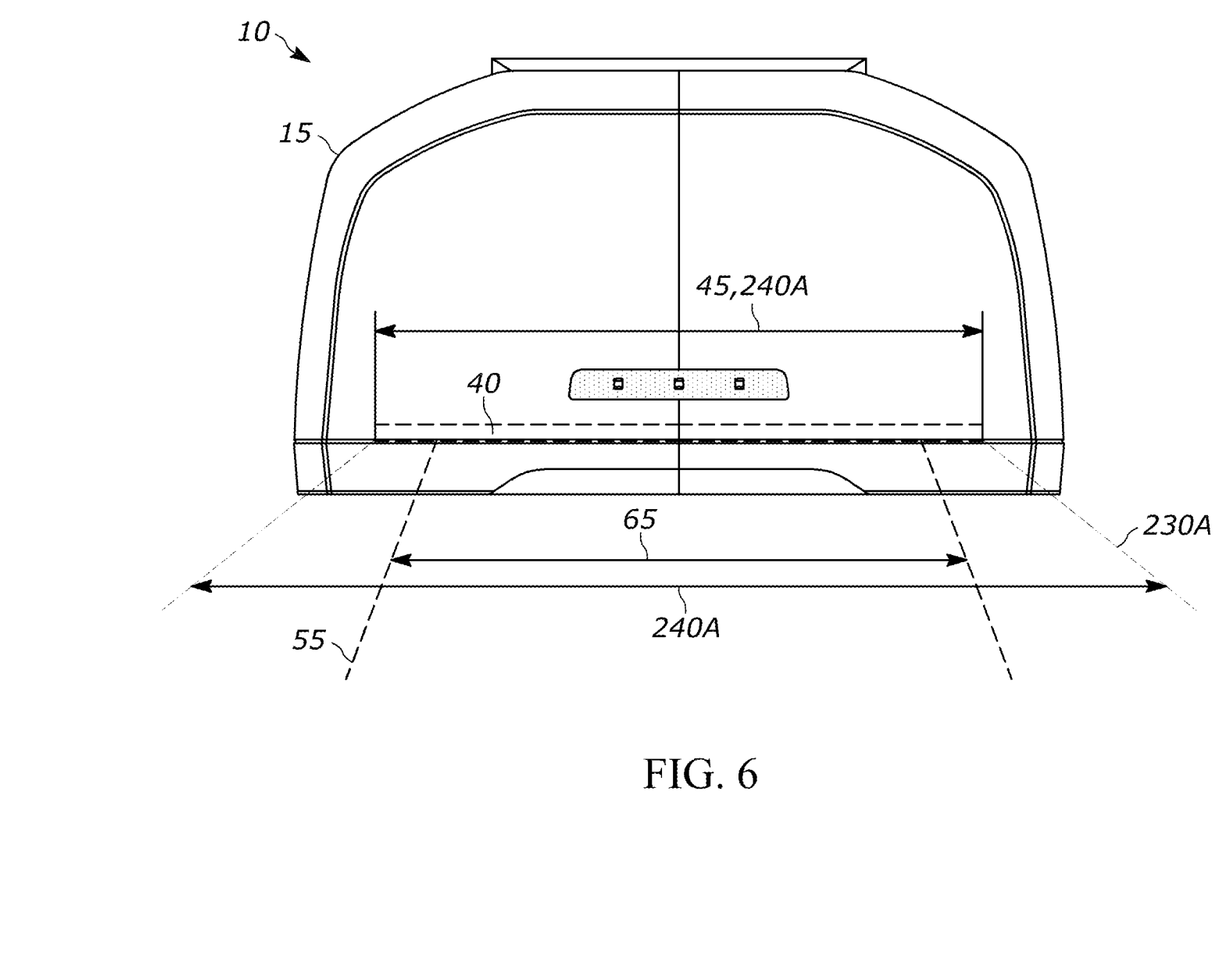
FIG. 6 illustrates a top view of the slot scanner assembly of FIG. 2.

In the example shown, IR receiver 225 has a second FOV 230A that is directed through window 40 and that overlaps first FOV 55 of imaging assembly 50 by a least 50% at window 40. A lens 265 can also be positioned in front of IR receiver 225 to assist in focusing IR illumination onto IR receiver 225. IR receiver 225 is recessed within housing 15 and is preferably spaced apart from a front face 32 of housing 15 by at least 1.25 inches. As shown in FIG. 6, with IR receiver 225 recessed in housing 15, a width 240A of second FOV 230A of IR receiver 225 at window 40 can be the same as, or at least cover a majority of, a width 45 of window 40. Recessing IR receiver 225 within housing 15 also provides additional benefits, such as: the return energy to IR receiver is more consistent over the working range of the slot scanner assembly so that an activation threshold can be more easily determined; allowing second FOV 230A of IR receiver 225 to cover the entire window (or most of it); the returned IR illumination is more even across second FOV 230A of IR receiver 225 so that saturation is less likely to occur; IR receiver being less susceptible to ambient light or adjacent IR systems, etc.

With IR receiver positioned in this way, width 240A of second FOV 230A of IR receiver 225 will be greater than width 65 of first FOV 55 of imaging assembly 50 so that first a first outside edge 245A of second FOV 230A is outside of a corresponding third outside edge 70 of first FOV 55 and a second outside edge 250A of second FOV 230A is outside of a correspond fourth outside edge 75 of first FOV 55 when slot scanner assembly 10 is positioned in a vertical first configuration, where window 40 is in a generally upright orientation. Preferably, first and second outside edges 245A, 250A of second FOV 230A of IR receiver 225 are outside of third and fourth outside edges 70, 75 of first FOV 55 of imaging assembly 50 at all positions along second central axis 235A that are outside of housing 15. However, first and second outside edges 245A, 250A of second FOV 230A of IR receiver 225 should be outside of third and fourth outside edges 70, 75 of first FOV 55 of imaging assembly 50 at least at positions along second central axis 235A that are further than 2 inches from window 40 for wakeup system 200A to be generally effective. By having first and second outside edges 245A, 250A of second FOV 230A of IR receiver 225 outside of third and fourth outside edges 70, 75 of first FOV 55 of imaging assembly 50, controller 95 can wake up and activate illumination system 80 and imaging assembly 50 when an object is swiped through second FOV 230A of IR receiver 225 from either direction, before a barcode on the object enters first FOV 55 of imaging assembly 50 which maximizes the number of frames that a barcode will appear in to increase the likelihood of a successful decode of the barcode.

Figure 2:
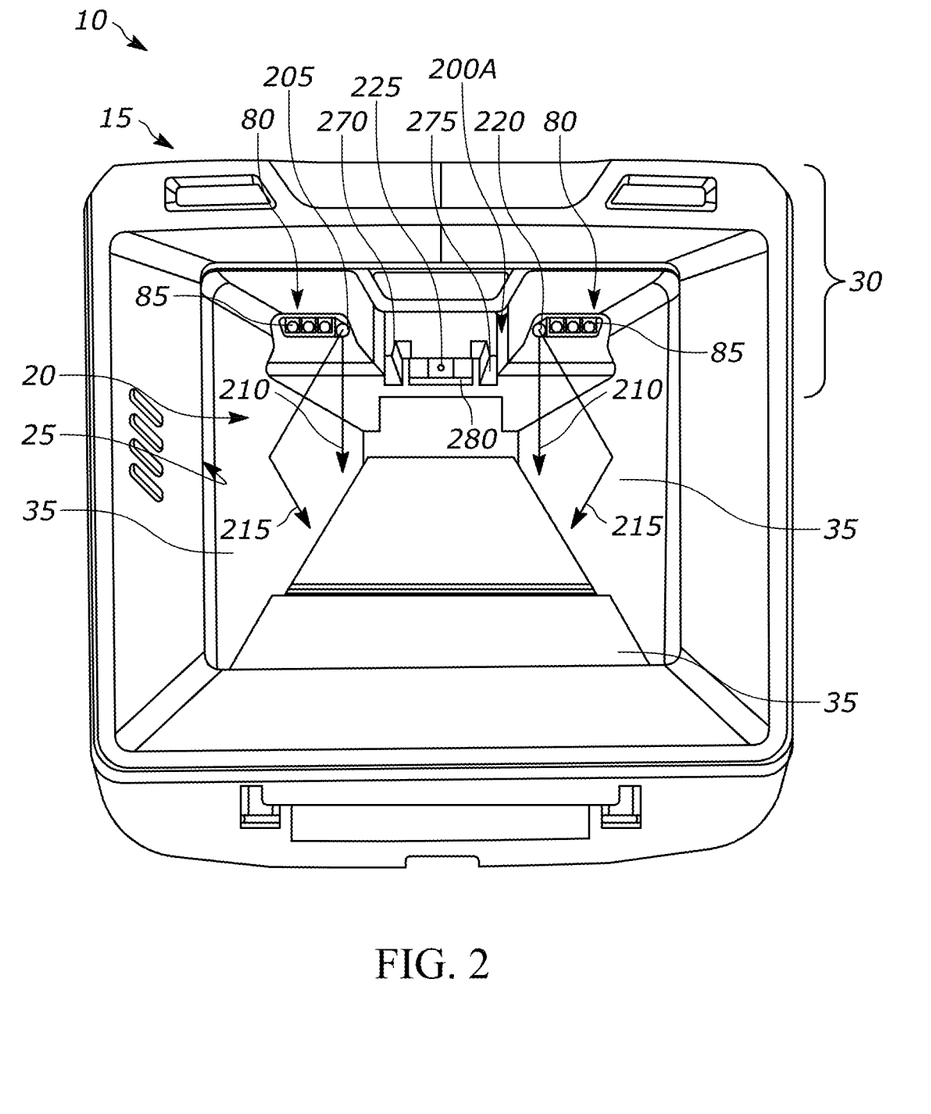
FIG. 2 illustrates a front view of the slot scanner assembly of FIG. 1 with a first example wakeup system.
Figure 3:
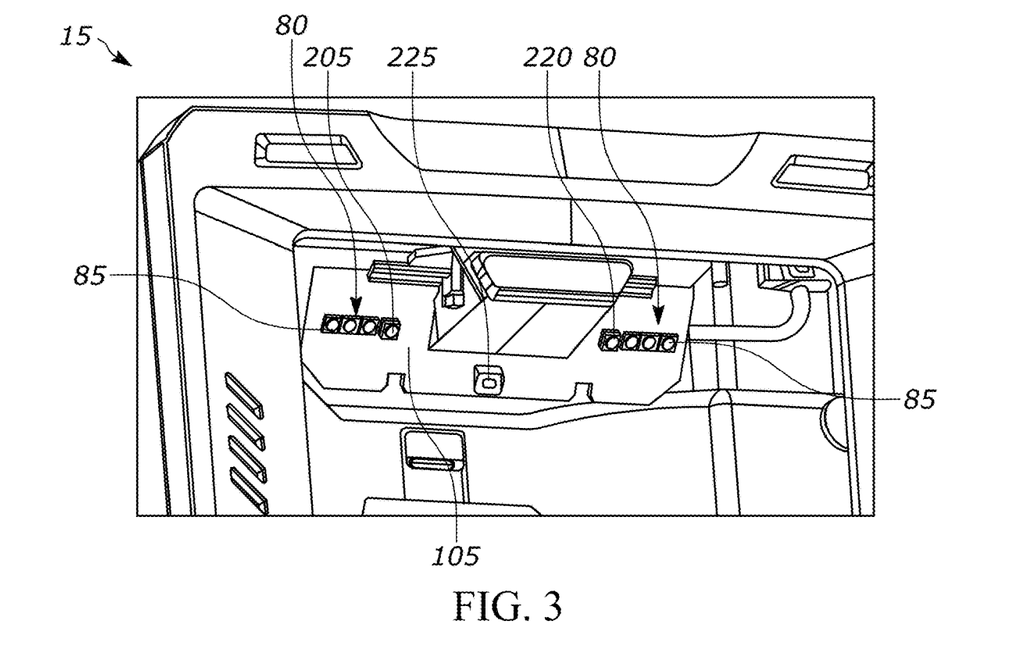
FIG. 3 illustrates an enlarged view of a portion of FIG. 2 with the IR scattering walls removed.
Figure 4:
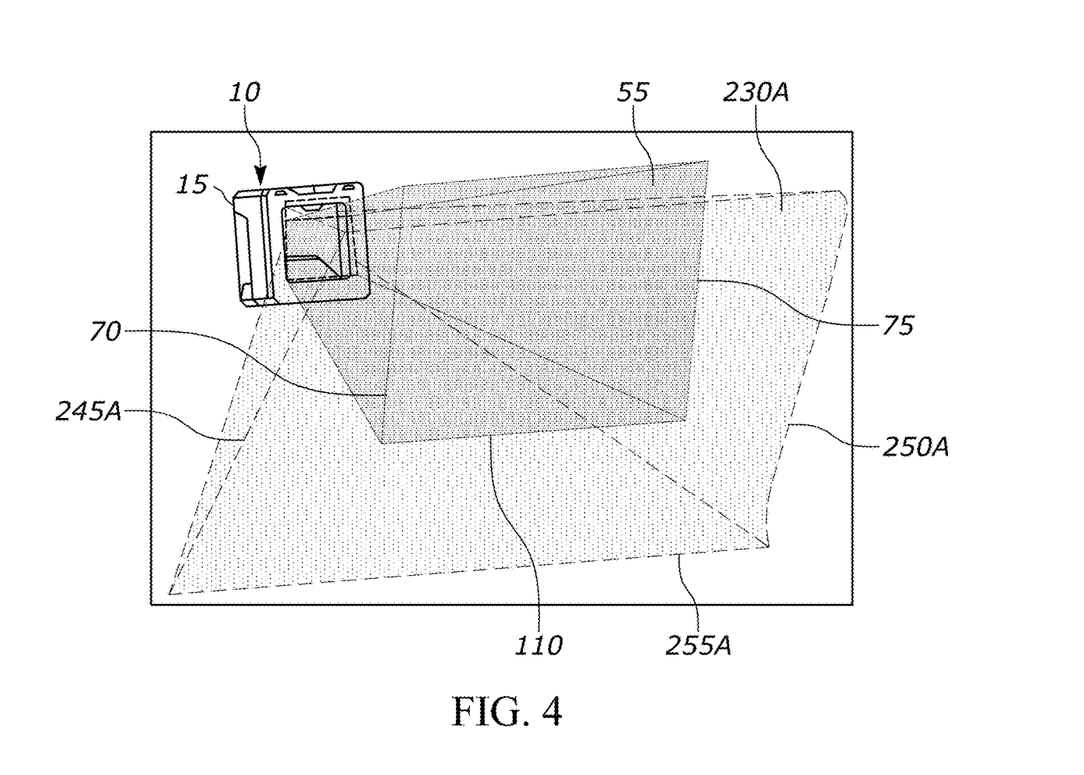
FIG. 4 illustrates a front perspective view of the slot scanner assembly of FIG. 2 showing the fields-of-view of the imaging assembly and the IR receiver.
Figure 5:
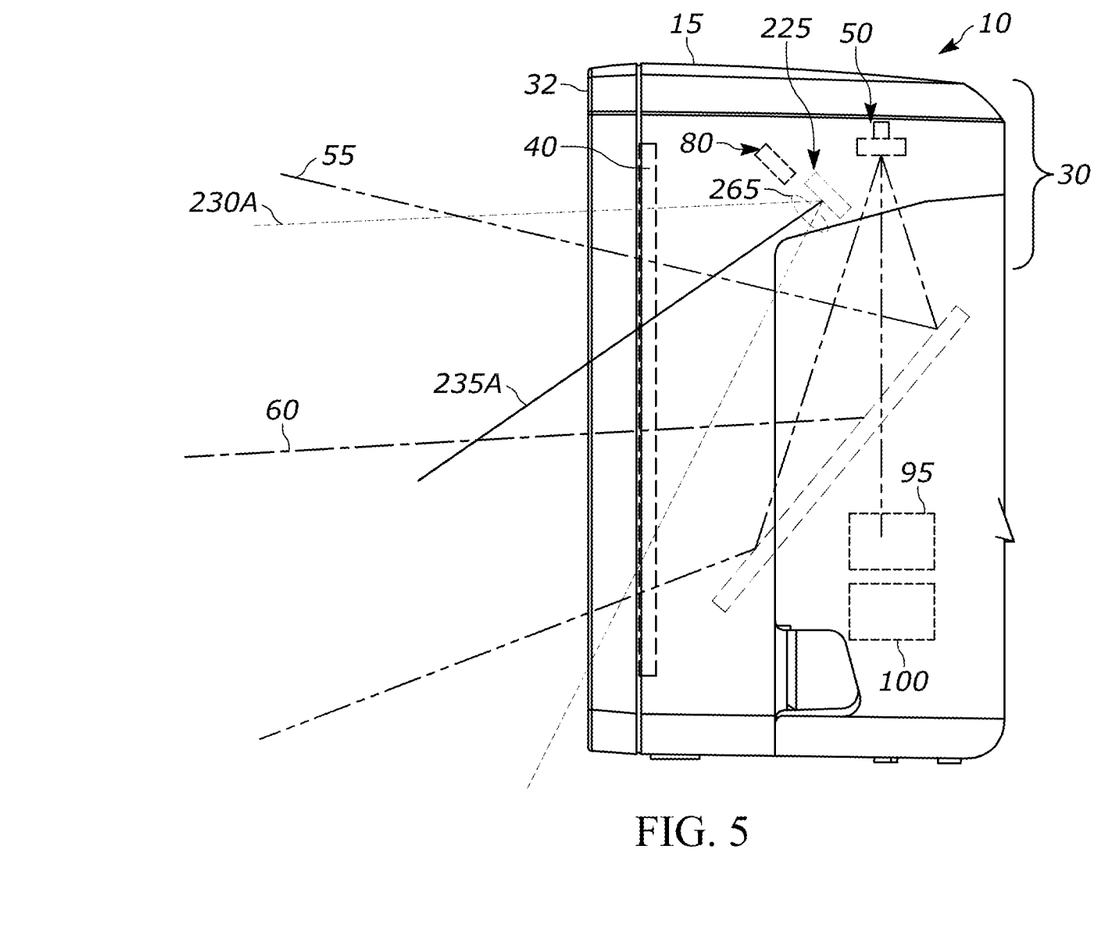
FIG. 5 illustrates a side view of the slot scanner assembly of FIG. 2.

In addition, as best seen in FIG. 2, to prevent IR receiver 225 from seeing areas of optical cavity 20 that are lit by scattered from first IR transmitter 205 and/or second IR transmitter 220 and help reduce noise levels, baffle ribs can be positioned around IR receiver 225. In the example shown, a first baffle rib 270 is positioned on a first side (left hand side as shown) of IR receiver 225, a second baffle rib 275 is positioned on a second side (right hand side as shown) of IR receiver 225, opposite the first side, and a third baffle rib 280 can be positioned on a third side (bottom side as shown) of IR receiver 225, between the first and second sides. First, second, and third baffles ribs 270, 275, 280 also prevent direct line of sight cross-talk between first and second IR transmitters 205, 220 and IR receiver 225.

Figure 7:
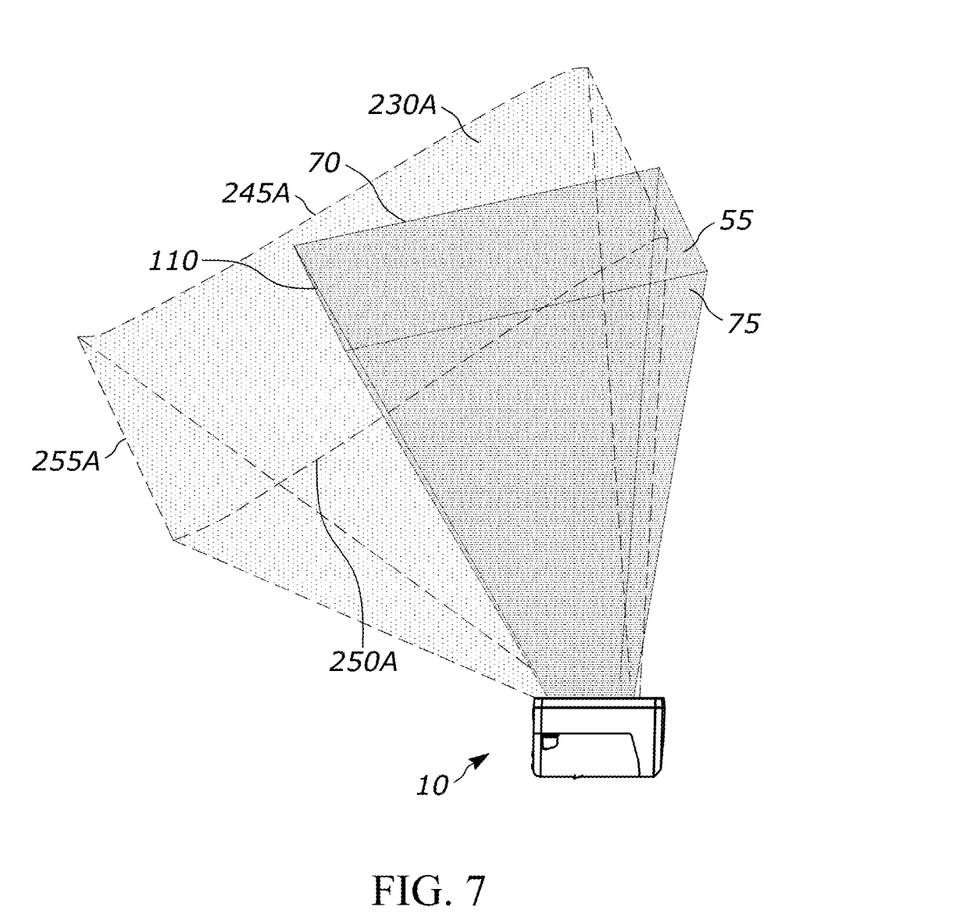
FIG. 7 illustrates a side perspective view of the slot scanner assembly of FIG. 2 showing the fields-of-view of the imaging assembly and the IR receiver and the slot scanner assembly in a horizontal orientation.
Figure 8:
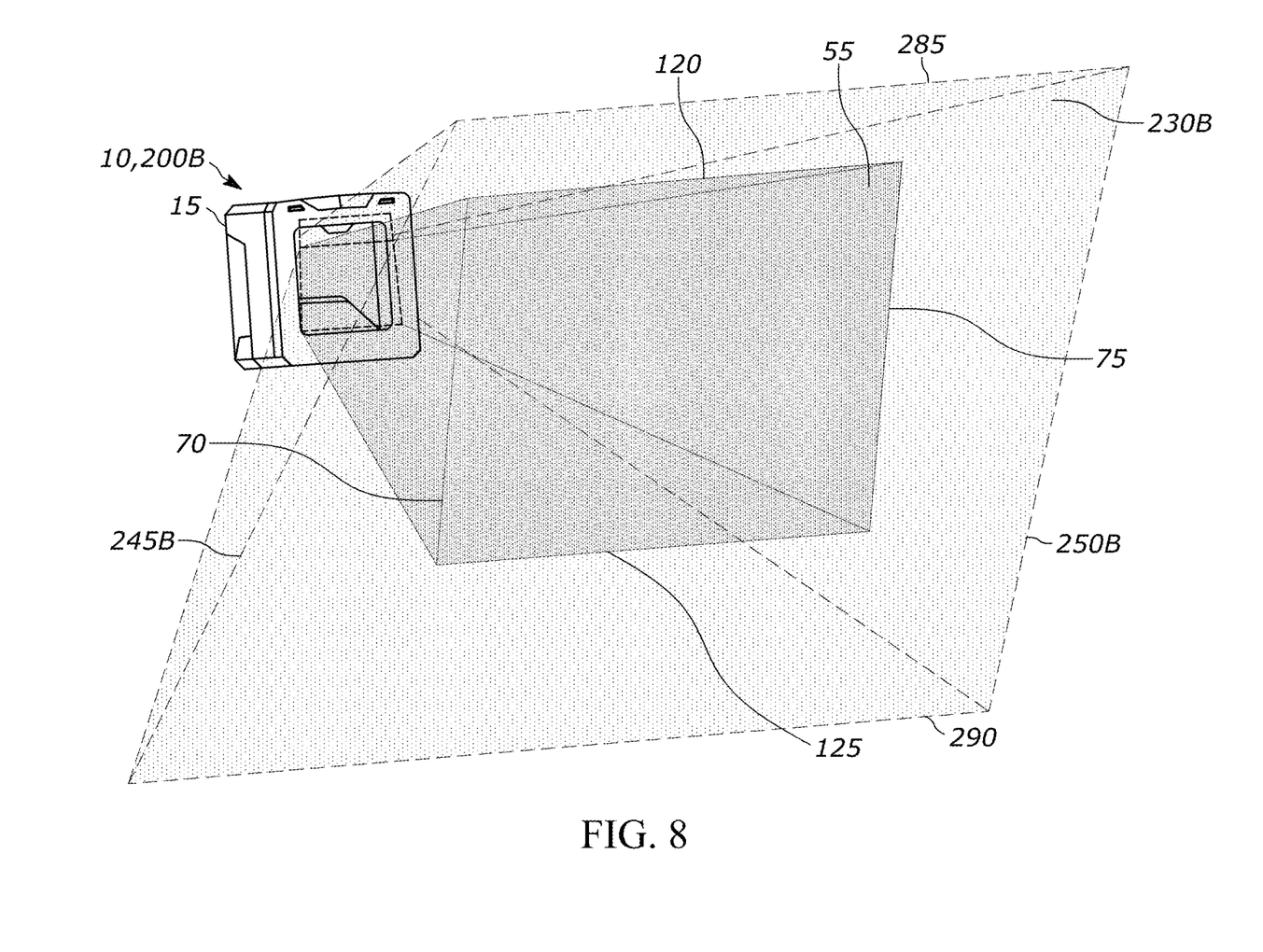
FIG. 8 illustrates a front perspective view of the slot scanner assembly of FIG. 1 with a second example wakeup system, showing the fields-of-view of the imaging assembly and the IR receiver.
Figure 9:
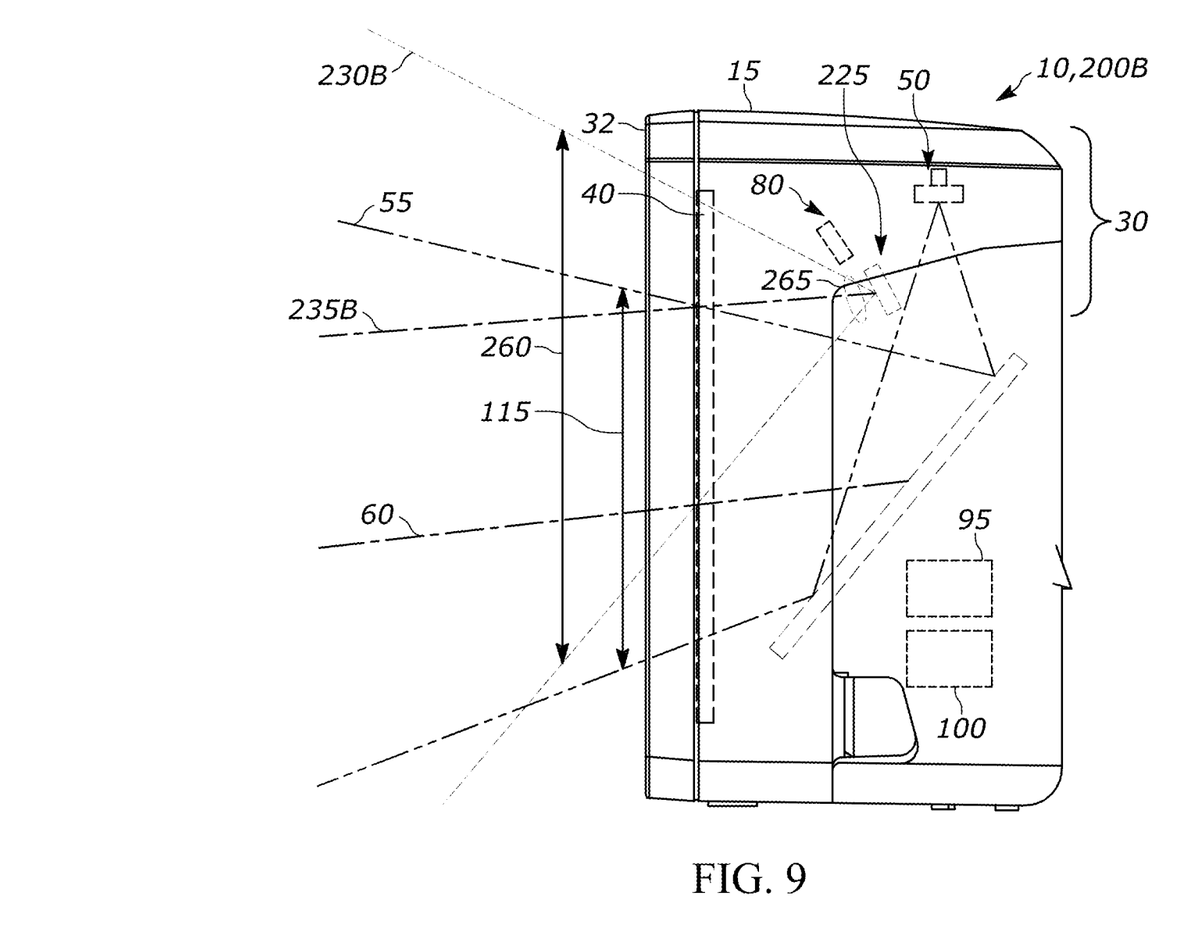
FIG. 9 illustrates a side view of the slot scanner assembly of FIG. 8.

Second FOV 230A of IR receiver 225 has a second central axis 235A that is non-perpendicular to window 40 such that second central axis 235A is tilted downward from horizontal when slot scanner assembly 10 is positioned in a vertical first configuration where window 40 is in a generally upright orientation. Tilting second central axis 235A downward below horizontal minimizes interference with IR receiver 225 from overhead lights or other adjacent IR systems. In addition, as can be seen in FIG. 7, tilting second central axis 235A in this way provides a first leading edge 255A of second FOV 230A of IR receiver 225 that is outside of a second leading edge 110 of first FOV 55 of imaging assembly 50 at positions along second central axis 235A that are outside of housing 15 when slot scanner assembly 10 is positioned in a horizontal second configuration where window 40 is in a generally horizontal orientation. By having first leading edge 255A of second FOV 230A outside of a second leading edge 110 of first FOV 55, an object being swiped past window 40 will be detected by wakeup system 200A before the object enters first FOV 55 of imaging assembly 50 and controller 95 can activate illumination system 80 and imaging assembly 50. This prevents the illumination from illumination system 80 from annoying a user when slot scanner assembly 10 is not in use and maximizes the number of frames that a barcode will appear in to increase the likelihood of a successful decode of the barcode.

Referring to FIGS. 8-12, slot scanner assembly 10 is illustrated with a second example wakeup system 200B. Wakeup system 200B is the same as wakeup system 200A, except that the second FOV 230B of IR receiver 225 of wakeup system 200B is oriented differently than second FOV 230A of IR receiver 225 of wakeup system 200A. Like wakeup system 200A, second example wakeup system 200B is positioned within housing 15 and generally includes first infrared (IR) transmitter 205 and IR receiver 225, which are preferably positioned in an upper portion 30 of housing 15, above first FOV 55 of imaging assembly 50 that is directed out of window 40. Wakeup system 200B can also include second IR transmitter 220, with first IR transmitter 205 being positioned on a first side of IR receiver 225 and second IR transmitter 220 being positioned on a second side of IR receiver 225, opposite the first side and first IR transmitter 205. Controller 95 is also in communication with wakeup system 200B and is configured to activate illumination system 80 when IR receiver 225 detects IR illumination reflected from an object within second FOV 230A of IR receiver 225. By activating illumination system 80 only when wakeup system 200B detects an object within second FOV 230A, illumination from illumination system 80 that may be directed at or reflected towards a user when slot scanner assembly 10 is not in use can be avoided.

First IR transmitter 205 and second IR transmitter 220 are configured to project IR illumination through window 40. Preferably, first portion 210 of the IR illumination from first IR transmitter 205 and second IR transmitter 220 is transmitted directly through window 40 and second portion 215 of the IR illumination from first IR transmitter 205 and second IR transmitter 220 is scattered off of IR scattering walls 35 within housing 15 and out of window 40. In the example shown illumination system 80, first IR transmitter 205, and IR receiver 225 are located on a common printed circuit board (PCB) 105, but could also be located on individual PCBs or any combination of PCBs, as appropriate.

Figure 10:
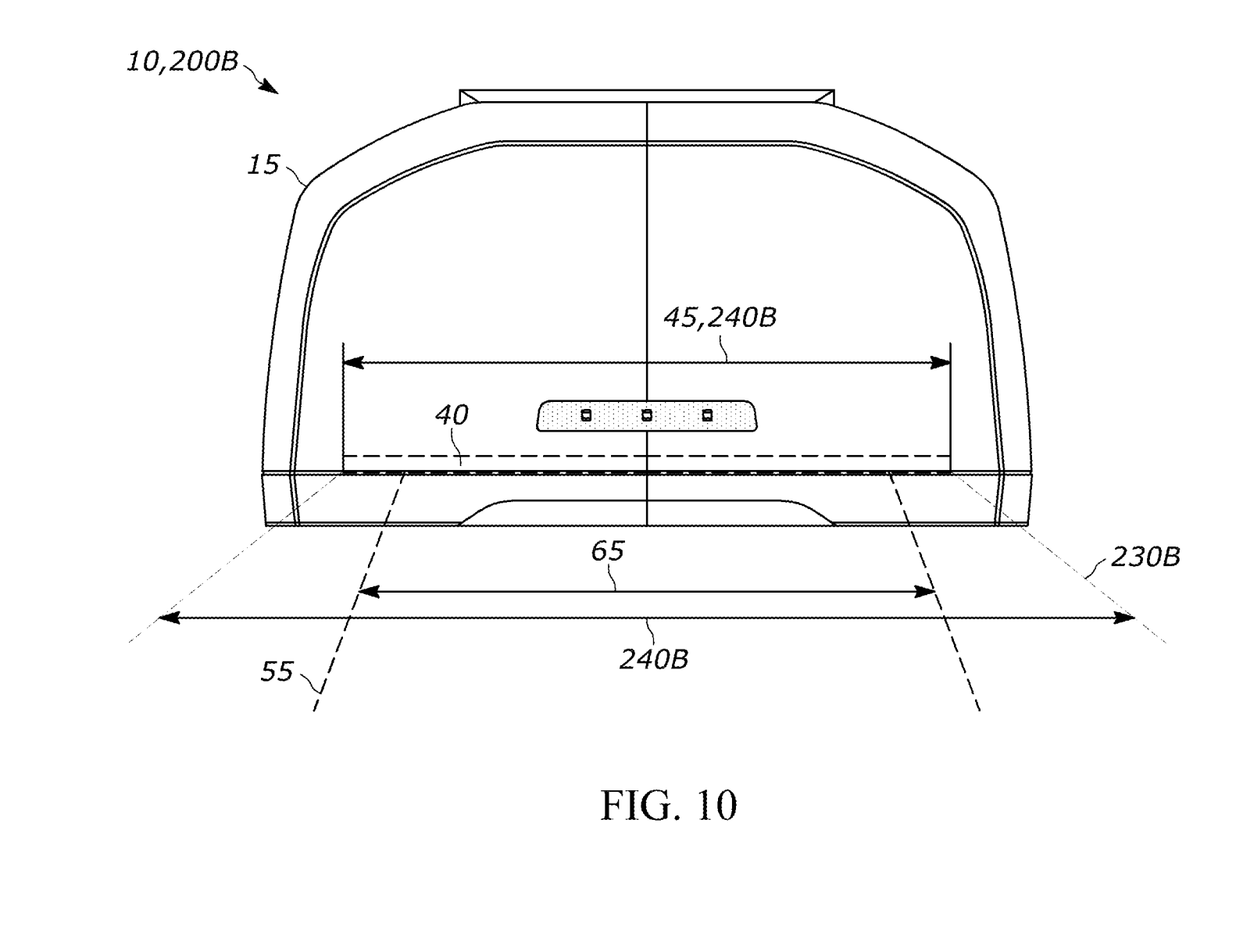
FIG. 10 illustrates a top view of the slot scanner assembly of FIG. 8.
Figure 11:
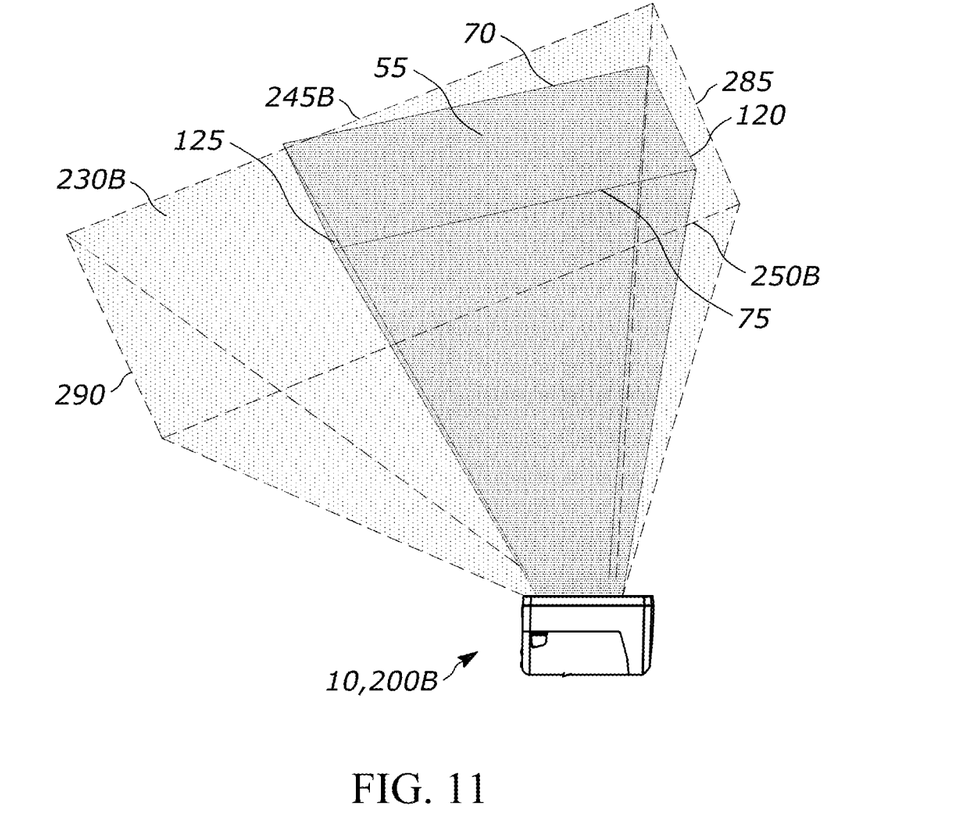
FIG. 11 illustrates a side perspective view of the slot scanner assembly of FIG. 8 showing the fields-of-view of the imaging assembly and the IR receiver and the slot scanner assembly in a horizontal orientation.

In wakeup system 200B, IR receiver 225 has a second FOV 230B that is directed through window 40 and that completely overlaps first FOV 55 of imaging assembly 50 at window 40 and a second central axis 235B that is generally parallel to first central axis 60 of first FOV 55 of imaging assembly 50. Lens 265 can also be positioned in front of IR receiver 225 to assist in focusing IR illumination onto IR receiver 225. IR receiver 225 is recessed within housing 15 and is preferably spaced apart from front face 32 of housing 15 by at least 1.25 inches. As shown in FIG. 10, with IR receiver 225 recessed in housing 15, a width 240B of second FOV 230B of IR receiver 225 at window 40 can be the same as, or at least cover a majority of, a width 45 of window 40.

With IR receiver positioned in this way, width 240B of second FOV 230B of IR receiver 225 will be greater than width 65 of first FOV 55 of imaging assembly 50 so that first a first outside edge 245B of second FOV 230B is outside of a corresponding third outside edge 70 of first FOV 55 and a second outside edge 250B of second FOV 230B is outside of a correspond fourth outside edge 75 of first FOV 55 when slot scanner assembly 10 is positioned in the vertical first configuration. Preferably, first and second outside edges 245B, 250B of second FOV 230B of IR receiver 225 are outside of third and fourth outside edges 70, 75 of first FOV 55 of imaging assembly 50 at all positions along second central axis 235B that are outside of housing 15. However, first and second outside edges 245B, 250B of second FOV 230B of IR receiver 225 should be outside of third and fourth outside edges 70, 75 of first FOV 55 of imaging assembly 50 at least at positions along second central axis 235B that are further than 2 inches from window 40 for wakeup system 200A to be generally effective. By having first and second outside edges 245B, 250B of second FOV 230B of IR receiver 225 outside of third and fourth outside edges 70, 75 of first FOV 55 of imaging assembly 50, controller 95 can wake up and activate illumination system 80 and imaging assembly 50 when an object is swiped through second FOV 230B of IR receiver 225 from either direction, before a barcode on the object enters first FOV 55 of imaging assembly 50 which maximizes the number of frames that a barcode will appear in to increase the likelihood of a successful decode of the barcode.

In addition, as can be seen in FIGS. 8-9 and 11-12, by positioning IR receiver 225 in this manner a first height 115 of first FOV 55 of imaging assembly 50 is less than a second height 260 of second FOV 230B of IR receiver 225 and opposing fifth outside edge 285 and sixth outside edge 290 of second FOV 230B are outside of opposing seventh outside edge 120 and eighth outside edge 125 of first FOV 55, respectively, preferably at positions along second central axis 235B that are outside of housing 15 with slot scanner assembly 10 in the horizontal second configuration. However, fifth and sixth outside edges 285, 290 of second FOV 230B of IR receiver 225 should be outside of seventh and eighth outside edges 120, 125 of first FOV 55 of imaging assembly 50 at least at positions along second central axis 235B that are further than 2 inches from window 40 for wakeup system 200B to be generally effective. By having fifth and sixth outside edges 285, 290 of second FOV 230B of IR receiver 225 outside of seventh and eighth outside edges 120, 125 of first FOV 55 of imaging assembly 50, an object being swiped past window 40 from either direction will be detected by wakeup system 200B before the object enters first FOV 55 of imaging assembly 50 and controller 95 can activate illumination system 80 and imaging assembly 50. This prevents the illumination from illumination system 80 from annoying a user when slot scanner assembly 10 is not in use and maximizes the number of frames that a barcode will appear in to increase the likelihood of a successful decode of the barcode.

As with wakeup system 200A, to prevent IR receiver 225 from seeing areas of optical cavity 20 that are lit by scattered from first IR transmitter 205 and/or second IR transmitter 220 and help reduce noise levels, baffle ribs can be positioned around IR receiver 225. In the example shown, a first baffle rib 270 is positioned on a first side (left hand side as shown) of IR receiver 225, a second baffle rib 275 is positioned on a second side (right hand side as shown) of IR receiver 225, opposite the first side, and a third baffle rib 280 can be positioned on a third side (bottom side as shown) of IR receiver 225, between the first and second sides. First, second, and third baffles ribs 270, 275, 280 also prevent direct line of sight cross-talk between first and second IR transmitters 205, 220 and IR receiver 225.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A slot scanner assembly, comprising:
   a housing including an optical cavity and an opening;
   a window at least partially covering the opening in the housing;
   an imaging assembly located within the housing and having a first field-of-view (FOV) directed through the window, the first FOV having a first central axis and the imaging assembly configured to capture an image frame of an environment appearing in the first FOV;
   an illumination system configured to provide illumination across at least a portion of the first FOV of the imaging assembly;
   a controller in communication with the imaging assembly to control operation of the imaging assembly and the illumination system to control operation of the illumination system;
   an image decoder in communication with the imaging assembly and the controller, the image decoder configured to receive the image frame and decode a barcode captured in image data captured by the imaging assembly; and
   a wakeup system, the wakeup system comprising:
      a first infrared (IR) transmitter positioned within the housing and configured to project IR illumination through the window; and
      an IR receiver positioned within the housing, the IR receiver having a second FOV directed through the window, the second FOV overlapping the first FOV of the imaging assembly by at least 50% at the window and having a second central axis that is non-perpendicular to the window such that the second central axis is tilted downward from horizontal with the slot scanner assembly positioned in a vertical first configuration where the window is in a generally upright orientation;
   wherein the controller is in communication with the wakeup system and is configured to activate the illumination system when the IR receiver detects IR illumination reflected from an object in the second FOV of the IR receiver.

2. The slot scanner assembly of claim 1, wherein a light source of the illumination system, the first IR transmitter, and the IR receiver are located on a common printed circuit board (PCB).

3. The slot scanner assembly of claim 1, wherein the first IR transmitter and the IR receiver are positioned in an upper portion of the housing, above the first FOV of the imaging assembly that is directed through the window.

4. The slot scanner assembly of claim 1, wherein a first width of the second FOV of the IR receiver at the window is the same as a second width of the window.

5. The slot scanner assembly of claim 1, wherein the first IR transmitter is positioned on a first side of the IR receiver and a second IR transmitter is positioned on a second side of the IR receiver, opposite the first side.

6. The slot scanner assembly of claim 1, wherein a first portion of the IR illumination from the first IR transmitter is transmitted directly through the window and a second portion of the IR illumination from the first IR transmitter is scattered off of IR scattering walls within housing and out of the window.

7. The slot scanner assembly of claim 1, wherein the IR receiver is recessed in the housing and is spaced apart from a front face of the housing by at least 1.25 inches.

8. The slot scanner assembly of claim 7, comprising a first baffle rib positioned on a first side of the IR receiver, a second baffle rib positioned on a second side of the IR receiver, opposite the first side, and a third baffle rib positioned on a third side of the IR receiver, between the first side and the second side.

9. The slot scanner assembly of claim 7, comprising a lens positioned in front of the IR receiver.

10. The slot scanner assembly of claim 1, wherein a first width of the first FOV of the imaging assembly is less than a second width of the second FOV of the IR receiver such that opposing first and second outside edges of the second FOV are outside of opposing third and fourth outside edges of the first FOV at positions along the second central axis that are outside of the housing with the slot scanner in the vertical first configuration.

11. The slot scanner assembly of claim 1, wherein a first width of the first FOV of the imaging assembly is less than a second width of the second FOV of the IR receiver such that opposing first and second outside edges of the second FOV are outside of opposing third and fourth outside edges of the first FOV at positions along the second central axis further than 2 inches from the window with the slot scanner in the vertical first configuration.

12. The slot scanner assembly of claim 1, wherein the housing is positionable in a horizontal second configuration where the window is in a generally horizontal orientation, and a first leading edge of the second FOV of the IR receiver is outside of a second leading edge of the first FOV of the imaging assembly at positions along the second central axis that are outside of the housing with the slot scanner in the horizontal second configuration.

13. A slot scanner assembly, comprising:
   a housing including an optical cavity and an opening;
   a window at least partially covering the opening in the housing;
   an imaging assembly located within the housing and having a first field-of-view (FOV) directed through the window, the first FOV having a first central axis and the imaging assembly configured to capture an image frame of an environment appearing in the first FOV;
   an illumination system configured to provide illumination across at least a portion of the first FOV of the imaging assembly;
   a controller in communication with the imaging assembly to control operation of the imaging assembly and the illumination system to control operation of the illumination system;
   an image decoder in communication with the imaging assembly and the controller, the image decoder configured to receive the image frame and decode a barcode captured in image data captured by the imaging assembly; and
   a wakeup system, the wakeup system comprising:
      a first infrared (IR) transmitter positioned within the housing and configured to project IR illumination through the window; and
      an IR receiver positioned within the housing, the IR receiver having a second FOV directed through the window, the second FOV completely overlapping the first FOV of the imaging assembly at the window and having a second central axis that is generally parallel to the first central axis of the first FOV of the imaging assembly;
   wherein the controller is in communication with the wakeup system and is configured to activate the illumination system when the IR receiver detects IR illumination reflected from an object in the second FOV of the IR receiver.

14. The slot scanner assembly of claim 13, wherein a light source of the illumination system, the first IR transmitter, and the IR receiver are located on a common printed circuit board (PCB).

15. The slot scanner assembly of claim 13, wherein the first IR transmitter and the IR receiver are positioned in an upper portion of the housing, above the first FOV of the imaging assembly that is directed through the window.

16. The slot scanner assembly of claim 13, wherein a first width of the second FOV of the IR receiver at the window is the same as a second width of the window.

17. The slot scanner assembly of claim 13, wherein the first IR transmitter is positioned on a first side of the IR receiver and a second IR transmitter is positioned on a second side of the IR receiver, opposite the first side.

18. The slot scanner assembly of claim 13, wherein a first portion of the IR illumination from the first IR transmitter is transmitted directly through the window and a second portion of the IR illumination from the first IR transmitter is scattered off of IR scattering walls within housing and out of the window.

19. The slot scanner assembly of claim 13, wherein the IR receiver is recessed in the housing and is spaced apart from a front face of the housing by at least 1.25 inches.

20. The slot scanner assembly of claim 19, comprising a first baffle rib positioned on a first side of the IR receiver, a second baffle rib positioned on a second side of the IR receiver, opposite the first side, and a third baffle rib positioned on a third side of the IR receiver, between the first side and the second side.

21. The slot scanner assembly of claim 19, comprising a lens positioned in front of the IR receiver.

22. The slot scanner assembly of claim 13, wherein a first width of the first FOV of the imaging assembly is less than a second width of the second FOV of the IR receiver such that opposing first and second outside edges of the second FOV are outside of opposing third and fourth outside edges of the first FOV at positions along the second central axis that are outside of the housing with the slot scanner in a vertical first configuration where the window is in a generally upright orientation.

23. The slot scanner assembly of claim 13, wherein a first width of the first FOV of the imaging assembly is less than a second width of the second FOV of the IR receiver such that opposing first and second outside edges of the second FOV are outside of opposing third and fourth outside edges of the first FOV at positions along the second central axis that are further than 2 inches from the window with the slot scanner in a vertical first configuration where the window is in a generally upright orientation.

24. The slot scanner assembly of claim 13, wherein a first height of the first FOV of the imaging assembly is less than a second height of the second FOV of the IR receiver such that opposing fifth and sixth outside edges of the second FOV are outside of opposing seventh and eighth outside edges of the first FOV at positions along the second central axis that are outside of the housing with the slot scanner assembly in a horizontal second configuration where the window is in a generally horizontal orientation.

25. The slot scanner assembly of claim 13, wherein a first height of the first FOV of the imaging assembly is less than a second height of the second FOV of the IR receiver such that opposing fifth and sixth outside edges of the second FOV are outside of opposing seventh and eighth outside edges of the first FOV at positions along the second central axis that are further than 2 inches from the window with the slot scanner assembly in a horizontal second configuration where the window is in a generally horizontal orientation.

* * * * *